United States Patent
Xie

(10) Patent No.: US 11,339,905 B2
(45) Date of Patent: May 24, 2022

(54) ADAPTER TO CONNECT WATER PIPE AND HIGH-PRESSURE SPRAY GUN

(71) Applicant: Xiangcheng Xie, Qiyang (CN)

(72) Inventor: Xiangcheng Xie, Qiyang (CN)

(*) Notice: Subject to any disclaimer, the term of this patent is extended or adjusted under 35 U.S.C. 154(b) by 0 days.

(21) Appl. No.: 17/394,501

(22) Filed: Aug. 5, 2021

(65) Prior Publication Data

US 2022/0065374 A1    Mar. 3, 2022

(30) Foreign Application Priority Data

Aug. 28, 2020    (CN) .......................... 202021841088.7

(51) Int. Cl.
*F16L 37/12*      (2006.01)
*F16L 37/138*     (2006.01)
*B05B 9/01*       (2006.01)
*F16L 15/00*      (2006.01)

(52) U.S. Cl.
CPC .............. *F16L 37/123* (2013.01); *B05B 9/01* (2013.01); *F16L 15/006* (2013.01); *F16L 37/138* (2013.01)

(58) Field of Classification Search
CPC .... F16L 37/123; F16L 37/138; F16L 37/0985
USPC ................................................. 285/314–317
See application file for complete search history.

(56) References Cited

U.S. PATENT DOCUMENTS

| | | | | |
|---|---|---|---|---|
| 511,992 A | * | 1/1894 | Blackburn | F16L 11/18 285/317 |
| 1,966,718 A | * | 7/1934 | Hanson | F16L 37/10 285/317 |
| 2,004,967 A | * | 6/1935 | Williams | F16L 37/53 285/314 |
| 3,224,800 A | * | 12/1965 | Fisher | E04G 5/02 285/315 |
| 3,403,930 A | * | 10/1968 | Bernier | H01R 13/6277 285/315 |
| 4,641,859 A | * | 2/1987 | Walters | F16L 37/0848 285/317 |
| 4,796,856 A | * | 1/1989 | Munini | F16L 37/098 285/315 |
| 6,890,004 B2 | * | 5/2005 | Naito | F16L 37/22 285/314 |
| 2004/0164547 A1 | * | 8/2004 | Cronley | F16L 37/1215 285/316 |

(Continued)

*Primary Examiner* — Matthew Troutman
*Assistant Examiner* — Fannie C Kee
(74) *Attorney, Agent, or Firm* — Rumit Ranjit Kanakia

(57) ABSTRACT

An adapter for connecting a water pipe and a high-pressure spray gun includes a connection assembly, a clamping assembly, and a covering member. The connection assembly includes a connector body defined by a side wall and extending between a proximal end and a distal end, and a chute that extends along the connection body between the proximal and distal ends. The water pipe is coupled along the proximal end and the spray gun is coupled along the distal end. The chute includes grooves, and tapered regions seamlessly extending below from the grooves. The clamping assembly is operatively coupled to the connector body. The covering member sleeves over the connection assembly to movably engage with the clamping assembly, and is pressed and released to realise the buckle to move down from the grooves towards the tapered regions and back from grooves to the tapered regions, to clamp the water pipe.

15 Claims, 2 Drawing Sheets

(56) References Cited

U.S. PATENT DOCUMENTS

2009/0008927 A1* 1/2009 Binder ................ F16L 37/0887
　　　　　　　　　　　　　　　　　　　　　　285/316

* cited by examiner

ADAPTER TO CONNECT WATER PIPE AND HIGH-PRESSURE SPRAY GUN

FIELD OF THE DISCLOSURE

The present disclosure relates to a connector, and more particularly, to an adapter for connecting a water pipe and a high-pressure spray gun.

BACKGROUND OF THE DISCLOSURE

A high-pressure cleaning device pressurizes water flow for cleaning various things with the water pressure. Generally, such high-pressure cleaning devices includes an attachment between a water pipe and a spray gun assembly from which the high-pressure water flow passes.

Therefore, in such assembly, switching between the water pipe and the spray gun is very important and reliability requirement is very high so that water leakage does not occur due to the water pipe falling off. Addition to that, the high-pressure cleaning device also needs to be conveniently disassembled and assembled when the device stops working.

Presently, such high-pressure cleaning devices are generally used in commercial field and that it has been comparatively less used in household applications.

In one such conventional attachment in the commercial field, the commercial high-pressure spray gun and the water pipe are connected by copper threads; this may be a firm way, but the sealing problem between the threads is difficult to solve, the disassembly is troublesome as additional tools are needed, the production cost may be very high, along with the hot-pin of the high-pressure washer.

Further, in household applications, which gradually may have more market potential than that of the commercial washer, the connection of the water pipe and the high-pressure spray gun also have seen such problems. Generally, connection mode of the household high-pressure spray gun and the water pipe is that a metal water pipe head is directly inserted into the high-pressure spray gun via a threaded connection. The metal water pipe head is provided with a sealing ring, and the sealing function can be realized after the metal water pipe head is inserted via the threads into the high-pressure spray gun.

However, a problem is encountered by consumers at present, the sizes and standards of a high-pressure spray gun and a water pipe used by a manufacturer of each cleaning machine are different, when the spray gun of the consumer is damaged, replacing the spray gun is difficult to find and connect with the existing water pipe.

Accordingly, there exists a need to overcome the shortcomings of the prior art and to provide convenient means to connect the water pipe and the high-pressure spray gun.

SUMMARY OF THE DISCLOSURE

In view of the foregoing disadvantages inherent in the prior art, the general purpose of the present disclosure is to provide a liquid-soap dispensing water-tap assembly for dispensing liquid-soap to include all advantages of the prior art, and to overcome the drawbacks inherent in the prior art.

An object of the present disclosure is to a convenient means to connect the water pipe and the high-pressure spray gun.

In view of the above object, in one aspect of the present disclosure, an adapter for connecting a water pipe and a high-pressure spray gun is provided. The adapter includes a connection assembly, a clamping assembly and a covering member. The connection assembly includes a connector body and a chute. The connector body is defined by a side wall and extending between a proximal end and a distal end. The water pipe is adapted to be coupled along the proximal end and the high-pressure spray gun is adapted to be coupled along the distal end. The chute is adapted to extend along the connection body between the proximal and distal ends. The chute includes grooves and tapered regions. The grooves are configured on the side wall of the connector body, and the tapered regions seamlessly extend below from the grooves on the side wall. Further, the clamping assembly is operatively coupled to the connector body. The clamping assembly includes a buckle and a fixing structure. The fixing structure extends outwardly from the side wall. The buckle engages with the fixing structure and clamps with the chute. The buckle includes a top portion, a middle portion and a bottom portion. The top portion is movably engaged with the grooves and passes through the chute along the proximal end. The middle portion extends along the side wall of the connector body between the proximal and distal ends. Further, the bottom portion is moveably engaged with the fixing structure along the distal end. Furthermore, the covering member sleeves over the connection assembly to movably engage with the clamping assembly. The covering member is pressed to realise the buckle to move down from the grooves towards the tapered regions to accommodate the water pipe in the chute. Further, the covering member is released to realise the buckle to move back into the grooves from the tapered regions to clamp the water pipe in the chute.

In one embodiment, the connection assembly includes one or more supporting ridges extending from the connector body below the tapered regions to stop the downward movement of the buckle, and also to support the covering member sleeves over the connection assembly.

In one embodiment, the connection assembly includes internal threads at the distal end to threadbly couple the high-pressure spray gun at the distal end.

In one embodiment, the chute gradually increases from the proximal end to the distal end.

In one embodiment, the fixing structure includes a top protrusion and a bottom protrusion. The top protrusion, which has height higher than the bottom protrusion seamlessly joint together with the bottom protrusion to define an engaging slot. The bottom portion of the buckle is moveably engaged with the engaging slot and slid therein when the covering member is pressed to realise the buckle to move down.

In one embodiment, the buckle has a biasing characteristic that has a capability to expand and retain back an original size thereof, and is made of a metal or a plastic.

In one embodiment, the covering member includes a movable cover and an opening. The opening is formed axially at a top of the movable cover and matches with the chute to enable water to flow therefrom.

In one embodiment, the adaptor further includes a flange structure circularly extending from the connector body proximate to the distal end.

In one embodiment, the adaptor further includes a snap coupling arrangement. The snap coupling arrangement includes a pair of slots and a pair of complementary snap element. The pair of slots is formed on the flange structure. The pair of complementary snap element is formed on the covering member. The pair of complementary snap element movably engages with the pair of slots.

In one embodiment, the adaptor further includes a recess arrangement. The recess arrangement includes a first recess and a second recess. The first recess is formed on the connection assembly, and the second recess is formed on the covering member. The first and second recesses are aligned with respect to each other, when the covering member sleeves over the connection assembly.

In one another aspect of the present disclosure, an adapter for connecting a water pipe and a high-pressure spray gun is provided. The adapter includes a connection assembly and a clamping assembly. The connection assembly includes a connector body and a chute. The connector body is defined by a side wall and extending between a proximal end and a distal end. The water pipe is adapted to be coupled along the proximal end and the high-pressure spray gun is adapted to be coupled along the distal end. The chute is adapted to extend along the connection body between the proximal and distal ends. The chute includes grooves and tapered regions. The grooves are configured on the side wall of the connector body, and the tapered regions seamlessly extend below from the grooves on the side wall. Further, the clamping assembly is operatively coupled to the connector body. The clamping assembly includes a buckle and a fixing structure. The fixing structure extends outwardly from the side wall. The buckle engages with the fixing structure and clamps with the chute. The buckle includes a top portion, a middle portion and a bottom portion. The top portion is movably engaged with the grooves and passes through the chute along the proximal end. The middle portion extends along the side wall of the connector body between the proximal and distal ends. Further, the bottom portion is moveably engaged with the fixing structure along the distal end.

The afore-mentioned objectives and additional aspects of the embodiments herein will be better understood when read in conjunction with the following description and accompanying drawings. It should be understood, however, that the following descriptions, while indicating preferred embodiments and numerous specific details thereof, are given by way of illustration and not of limitation. This section is intended only to introduce certain objects and aspects of the present disclosure, and is therefore, not intended to define key features or scope of the subject matter of the present disclosure.

BRIEF DESCRIPTION OF THE DRAWINGS

The figures mentioned in this section are intended to disclose exemplary embodiments of the claimed system and method. Further, the components/modules and steps of a process are assigned reference numerals that are used throughout the description to indicate the respective components and steps. Other objects, features, and advantages of the present disclosure will be apparent from the following description when read with reference to the accompanying drawings.

Like reference numerals refer to like parts throughout the description of several views of the drawings.

DETAILED DESCRIPTION OF THE DISCLOSURE

Figure 1:
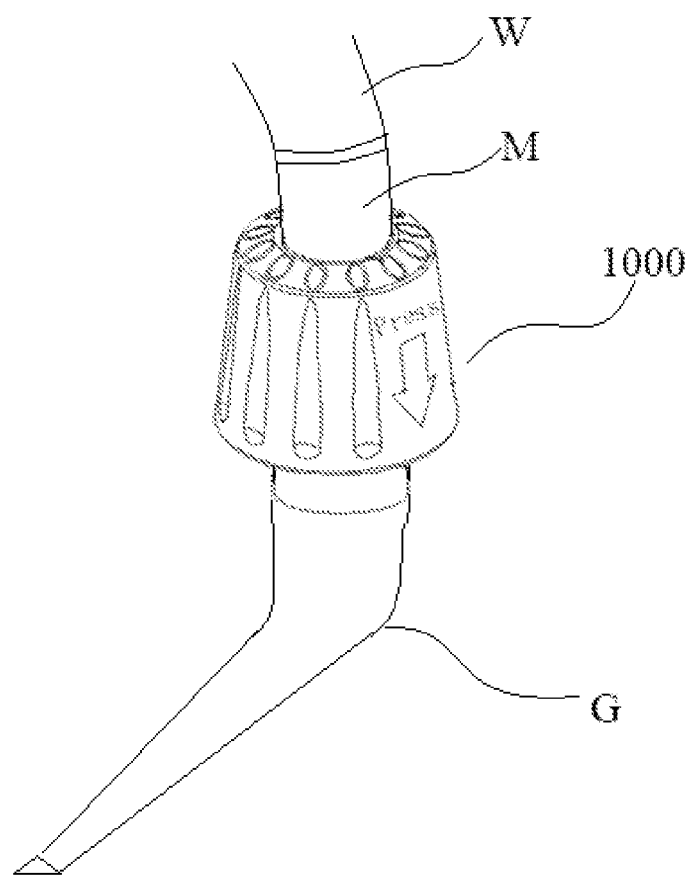
FIG. 1 illustrates an adaptor coupled with a water pipe and a high-pressure spray gun, in accordance with an exemplary embodiment of the present disclosure.

This section is intended to provide explanation and description of various possible embodiments of the present disclosure. The embodiments used herein, and various features and advantageous details thereof are explained more fully with reference to non-limiting embodiments illustrated in the accompanying drawings and detailed in the following description. The examples used herein are intended only to facilitate an understanding of ways in which the embodiments herein may be practiced and to further enable the person skilled in the art to practice the embodiments used herein. Also, the examples/embodiments described herein should not be construed as limiting the scope of the embodiments herein. Corresponding reference numerals indicate corresponding parts throughout the drawings.

The terms "a" and "an" herein do not denote a limitation of quantity, but rather denote the presence of at least one of the referenced items.

The terms "having", "comprising", "including", and variations thereof signify the presence of a component.

The present disclosure provides an adapter for connecting a water pipe and a high-pressure spray gun. The adapter includes a connection assembly, a clamping assembly and a covering member. The connection assembly includes a connector body and a chute. The connector body is defined by a side wall and extending between a proximal end and a distal end. The water pipe is adapted to be coupled along the proximal end and the high-pressure spray gun is adapted to be coupled along the distal end. The chute is adapted to extend along the connection body between the proximal and distal ends. The chute includes grooves and tapered regions. The grooves are configured on the side wall of the connector body, and the tapered regions seamlessly extend below from the grooves on the side wall. Further, the clamping assembly is operatively coupled to the connector body. The clamping assembly includes a buckle and a fixing structure. The fixing structure extends outwardly from the side wall. The buckle engages with the fixing structure and clamps with the chute. The buckle includes a top portion, a middle portion and a bottom portion. The top portion is movably engaged with the grooves and passes through the chute along the proximal end. The middle portion extends along the side wall of the connector body between the proximal and distal ends. Further, the bottom portion is moveably engaged with the fixing structure along the distal end.

Furthermore, the covering member may sleeve over the connection assembly to movably engage with the clamping assembly. The covering member is pressed to realise the buckle to move down from the grooves towards the tapered regions to accommodate the water pipe in the chute. Further, the covering member is released to realise the buckle to move back into the grooves from the tapered regions to clamp the water pipe in the chute.

Figure 2:
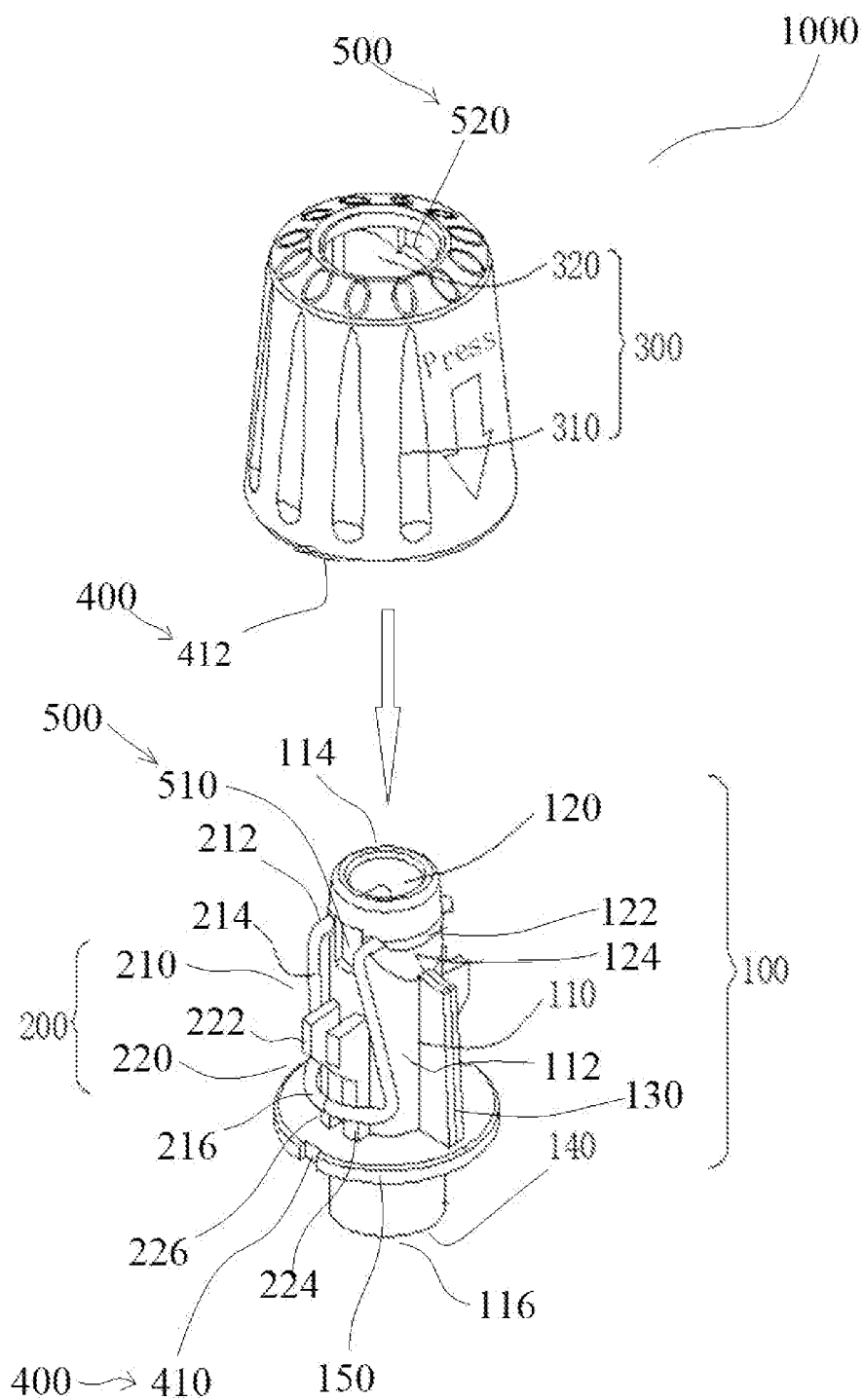
FIG. 2 illustrates an exploded view of the adaptor of FIG. 1, in accordance with an exemplary embodiment of the present disclosure.

Referring now to FIGS. 1 and 2, which, respectively, illustrates an adaptor 1000 coupled with a water pipe 'W' and a high-pressure spray gun 'G', and an exploded view of the adaptor of FIG. 1, in accordance with an exemplary embodiment of the present disclosure.

As shown in FIGS. 1 and 2, the adapter 1000 for connecting the water pipe 'W' and a high-pressure spray gun 'G', includes a connection assembly 100, a clamping assembly 200 and a covering member 300 coupled to each other, as will be explained hereinbelow.

As seen in FIG. 2, the connection assembly 100 includes a connector body 110 and a chute 120. The connector body 110 is defined by a side wall 112 and extending between a proximal end 114 and a distal end 116. The water pipe 'W' is adapted to be coupled along the proximal end 114 and the high-pressure spray gun 'G' is adapted to be coupled along the distal end 116. In one embodiment, as seen in FIG. 1, the water pipe 'W' may include a metal head 'M' at an end portion of the water pipe 'W'. The water pipe 'W' through the metal head 'M' is coupled along the proximal end 114 using the clamping assembly 200. In one embodiment, the connection assembly 100 includes internal threads 140 at the distal end 116 to threadbly couple the high-pressure spray gun at the distal end 116. Further, the chute 120 is adapted to extend along the connection body 110 between the proximal and distal ends 114, 116. In one embodiment, the chute 120 may gradually increases from the proximal end 114 to the distal end 116. However, without departing from the scope of the present disclosure, the chute 120 may be of constant diameter across the length between the proximal end 114 and the distal end 116. In one more preferred arrangement, the chute 120 includes grooves 122 and tapered regions 124. The grooves 122 is configured on the side wall 112 of the connector body 110, and the tapered regions 124 seamlessly extend below from the grooves 122 on the side wall 112.

Further, as seen in FIG. 2, in one embodiment, the connection assembly 100 may include one or more supporting ridges 130 extending from the connector body 110 below the tapered regions 124, and will be described hereinbelow.

Further, as seen in FIG. 2, the clamping assembly 200 is operatively coupled to the connector body 110. The clamping assembly 200 includes a buckle 210 and a fixing structure 220. The fixing structure 220 extends outwardly from the side wall 112. Further, buckle 210 engages with the fixing structure 220 and clamps with the chute 120. In one embodiment, the buckle 210 has a biasing characteristic that has a capability to expand and retain back an original size thereof. The buckle 210 may be made of in one-piece and of a metal or a plastic material. In one most preferred embodiment of the present disclosure, the buckle 210 includes a top portion 212, a middle portion 214 and a bottom portion 216. The top portion 212 is movably engaged with the grooves 122 and passes through the chute 120 along the proximal end 114. The middle portion 214 extends along the side wall 112 of the connector body 110 between the proximal and distal ends 114, 116. Further, the bottom portion 216 is moveably engaged with the fixing structure 200 along the distal end 116. In one embodiment, the buckle 210 that may have one-piece structure may include a double-loop U-shaped structure, which from the top portion 212 may be engaged with both sides of the grooves 122 formed on the side wall 112, and that from the bottom portion 216 may be engaged with the both sides of the fixing structure 200 formed on the side wall 112. However, without departing from the scope of the present disclosure, in another embodiment, the buckle 210 that may have one-piece structure may include a double-loop L-shaped structure, which from the top portion 212 may be engaged with one side of the grooves 122 formed on the side wall 112, and that from the bottom portion 216 may be engaged with the one side of the fixing structure 200 formed on the side wall 112.

In one embodiment, as seen in FIG. 2, the fixing structure 220 includes a top protrusion 222 and a bottom protrusion 224. The top protrusion 222, which has height higher than the bottom protrusion 224 seamlessly joint together with the bottom protrusion 224 to define an engaging slot 226. The bottom portion 216 of the buckle 210 is moveably engaged with the engaging slot 226 and slid therein when the covering member 300 is pressed to realise the buckle 210 to move down.

Furthermore, in one embodiment, as seen in FIG. 2, the covering member 300 is adapted to sleeve over the connection assembly 110 to movably engage with the clamping assembly 200. The covering member 300 when sleeves over to the connection assembly 110 is also supported by one or more supporting ridges 130 formed on the connection assembly 110. In one example structure, the covering member 300 includes a movable cover 310 and an opening 320. The opening 320 is formed axially at a top of the movable cover 310 and matches with the chute 120 to enable water cover to flow therefrom.

In one embodiment, the adaptor may include a flange structure 150 circularly extending from the connector body 110 proximate to the distal end 116. Further, in one embodiment, the adaptor further includes a snap coupling arrangement 400. The snap coupling arrangement 400 includes a pair of slots 410 and a pair of complementary snap element 412. The pair of slots 410 is formed on the flange structure 150. The pair of complementary snap element 412 is formed on the covering member 300. The pair of complementary snap element 412 movably engages with the pair of slots 410 to enable the coupled of the covering member 300 with the connector body 110 of the connection assembly 100.

In one embodiment, the adaptor further includes a recess arrangement 500. The recess arrangement 500 includes a first recess 510 and a second recess 520. The first recess 510 is formed on the connection assembly 100, and the second recess 520 is formed on the covering member 300. The first and second recesses 510, 520 are align with respect to each other, when the covering member 300 sleeves over the connection assembly 110.

As seen in FIG. 2, in operation, the covering member 300 may be pressed to realise the buckle 210 to move down from the grooves towards the tapered regions 124 to accommodate the metal head 'M' of the water pipe 'W' in the chute 120. Further, such downward movement of the buckle 210 may be stop by the one or more supporting ridges 130 formed on the connection assembly 110. Furthermore, the pressed covering member 300 may be released to realise the buckle 210 to move back into the grooves 122 from the tapered regions 124 to clamp the metal head 'M' of the water pipe 'W', as seen in FIG. 1, in the chute 120 along the proximal end 114.

In alternative embodiment, the high-pressure spray gun 'G' may also be snappedly coupled like the water pipe 'W' as explained above, if the connection assembly 100 includes such arrangement, instead of the internal threads 140, at the distal end 116.

The present disclosure is advantageous to provide a convenient means to connect the water pipe and the high-pressure spray gun by enabling a snap coupling against threaded coupled.

Although the subject matter is described in language specific to structural features and/or acts, it is to be understood that the subject matter defined in the claims is not necessarily limited to the specific features or process as described above. In fact, the specific features and acts described above are disclosed as mere examples of implementing the claims and other equivalent features and processes which are intended to be within the scope of the claims.

What is claimed is:

1. An adaptor for connecting a water pipe and a high-pressure spray gun, the adapter comprising:
   a connection assembly having:
      a connector body defined by a side wall and extending between a proximal end and a distal end, wherein the water pipe is adapted to be coupled along the proximal end and the high-pressure spray gun is adapted to be coupled along the distal end, a chute extending along the connector body between the proximal and distal ends, the chute having:
  grooves on the side wall of the connector body, and
  tapered regions seamlessly extending below the grooves on the side wall;
a clamping assembly operatively coupled to the connector body, the clamping assembly having:
  a buckle; and
  a fixing structure extends outwardly from the side wall, wherein the buckle clamps with the chute, the buckle having:
    a top portion movably engaged with the grooves and passing through the chute along the proximal end,
    a middle portion extending along the side wall of the connector body between the proximal and distal ends, and
    a bottom portion moveably engaged with the fixing structure along the distal end; and
a covering member sleeved over the connection assembly to movably engage with the clamping assembly,
wherein the covering member is pressed to realise the buckle to move down from the grooves towards the tapered regions to accommodate the water pipe in the chute,
wherein the covering member is released to realise the buckle to move back into the grooves from the tapered regions to clamp the water pipe in the chute, and
wherein the fixing structure comprises a top protrusion and a bottom protrusion, the top protrusion, which has a height higher than the bottom protrusion, seamlessly joints together with the bottom protrusion to define an engaging slot, wherein the bottom portion of the buckle moveably engages with the engaging slot and is slid therein when the covering member is pressed to relise the buckle to move down.

2. The adaptor as claimed in claim 1, wherein the connection assembly comprises one or more supporting ridges extending from the connector body below the tapered regions to stop the downward movement of the buckle, and also to support the covering member which sleeves over the connection assembly.

3. The adaptor as claimed in claim 1, wherein the connection assembly comprises internal threads at the distal end to threadably couple the high-pressure spray gun at the distal end.

4. The adaptor as claimed in claim 1, wherein the chute gradually increases from the proximal end to the distal end.

5. The adaptor as claimed in claim 1, wherein the buckle has a biasing characteristic that has a capability to expand and retain back an original size thereof, and is made of a metal or a plastic.

6. The adaptor as claimed in claim 1, wherein covering member comprises:
  a movable cover; and
  an opening formed axially at a top of the movable cover, wherein the opening matches with the chute to enable water to flow therefrom.

7. The adaptor as claimed in claim 1 further comprising a flange structure circularly extending from the connector body proximate to the distal end.

8. The adaptor as claimed in claim 7 further comprising a snap coupling arrangement, wherein the snap coupling arrangement comprises:
  a pair of slots formed on the flange structure; and
  a pair of complementary snap elements on the covering member, wherein the pair of complementary snap elements movably engages with the pair of slots.

9. The adaptor as claimed in claim 1 further comprising a recess arrangement, wherein the recess arrangement comprises:
  a first recess formed on the connection assembly; and
  a second recess formed on the covering member, wherein the first and second recess are aligned with respect to each other, when the covering member sleeves over the connection assembly.

10. An adaptor for connecting a water pipe and a high-pressure spray gun, the adapter comprising:
  a connection assembly having:
    a connector body defined by a side wall and extending between a proximal end and a distal end, wherein the water pipe is adapted to be coupled along the proximal end and the high-pressure spray gun is adapted to be coupled along the distal end,
    a chute extending along the connecter body between the proximal and distal ends, the chute having:
      grooves on the side wall of the connector body, and
      tapered regions seamlessly extending below the grooves on the side wall; and
  a clamping assembly operatively coupled to the connector body, the clamping assembly having:
    a buckle; and
    a fixing structure extending outwardly from the side wall,
    wherein the buckle clamps with the chute, the buckle having:
      a top portion movably engaged with the grooves and passing through the chute along the proximal end,
      a middle portion extending along the side wall of the connector body between the proximal and distal ends, and
      a bottom portion moveably engaged with the fixing structure along the distal end,
    wherein the fixing structure comprises a top protrusion and a bottom protrusion, the top protrusion, which has a height higher than the bottom protrusion, seamlessly joints together with the bottom protrusion to define an engaging slot, wherein the bottom portion of the buckle moveably engages with the engaging slot and is slid therein.

11. The adaptor as claimed in claim 10, wherein the connection assembly comprises one or more supporting ridges extending from the connector body below the tapered regions to stop a downward movement of the buckle.

12. The adaptor as claimed in claim 10, wherein the connection assembly comprises internal threads at the distal end to threadably couple the high-pressure spray gun at the distal end.

13. The adaptor as claimed in claim 10, wherein the chute gradually increases from the proximal end to the distal end.

14. The adaptor as claimed in claim 10, wherein the buckle has a biasing characteristic that has a capability to expand and retain back an original size thereof, and is made of a metal or a plastic.

15. The adaptor as claimed in claim 10 further comprising a flange structure circularly extending from the connector body proximate to the distal end.

* * * * *